US012180840B1

(12) United States Patent
Bidkar et al.

(10) Patent No.: US 12,180,840 B1
(45) Date of Patent: Dec. 31, 2024

(54) SEAL ASSEMBLY FOR A TURBINE ENGINE

(71) Applicant: General Electric Company, Schenectady, NY (US)

(72) Inventors: Rahul Anil Bidkar, Clifton Park, NY (US); Christopher Walter Falcone, Schenectady, NY (US); Grant Robert Portune, Cincinnati, OH (US); Nora Marie Molino, Schenectady, NY (US); Matthew James Misch, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/406,540

(22) Filed: Jan. 8, 2024

(51) Int. Cl.
*F01D 11/00* (2006.01)

(52) U.S. Cl.
CPC ........ *F01D 11/001* (2013.01); *F05D 2240/55* (2013.01)

(58) Field of Classification Search
CPC .... F01D 11/001; F01D 11/005; F01D 11/025; F01D 11/22; F05D 2240/55; F05D 2240/57; F05D 2260/38; F16J 15/442; F16J 15/24
See application file for complete search history.

(56) References Cited

U.S. PATENT DOCUMENTS

| | | |
|---|---|---|
| 5,014,999 A | 5/1991 | Makhobey |
| 5,100,158 A | 3/1992 | Gardner |
| 5,388,843 A | 2/1995 | Sedy |
| 5,503,407 A | 4/1996 | McNickle |
| 5,509,664 A | 4/1996 | Borkiewicz |
| 6,145,843 A | 11/2000 | Hwang |
| 6,505,837 B1 | 1/2003 | Heshmat |
| 6,692,006 B2 | 2/2004 | Holder |
| 6,811,154 B2 | 11/2004 | Proctor et al. |
| 7,726,660 B2 | 6/2010 | Datta |
| 8,002,285 B2 | 8/2011 | Justak |
| 8,490,982 B2 | 7/2013 | Roche et al. |
| 8,641,045 B2 | 2/2014 | Justak |
| 9,045,994 B2 | 6/2015 | Bidkar et al. |
| 9,115,810 B2 | 8/2015 | Bidkar et al. |
| 9,145,785 B2 | 9/2015 | Bidkar et al. |
| 9,255,642 B2 | 2/2016 | Bidkar et al. |
| 9,359,908 B2 | 6/2016 | Bidkar et al. |
| 9,587,746 B2 | 3/2017 | Bidkar et al. |

(Continued)

*Primary Examiner* — David E Sosnowski
*Assistant Examiner* — Maxime M Adjagbe
(74) *Attorney, Agent, or Firm* — Dority & Manning, P.A.

(57) ABSTRACT

A turbine engine includes a rotor, a stator having an aft wall, and a seal assembly having a plurality of seal segments disposed between the rotor and the stator. The rotor, the stator, and the seal assembly are arranged together to define a high pressure region and a low pressure region. The turbine engine also includes at least one biasing member engaged with one or more of the plurality of seal segments. The plurality of seal segments include a primary seal segment and a secondary seal segment connected together via a flexible joint. As such, the flexible joint allows for angular misalignment between the primary seal segment and the secondary seal segment, thereby allowing the primary seal segment to move with the rotor while the secondary seal segment maintains contact with the aft wall of the stator.

18 Claims, 5 Drawing Sheets

(56) References Cited

U.S. PATENT DOCUMENTS

| | | | | |
|---|---|---|---|---|
| 9,976,420 | B2 | 5/2018 | Tran et al. | |
| 10,161,259 | B2 | 12/2018 | Gibson et al. | |
| 10,190,431 | B2 | 1/2019 | Bidkar et al. | |
| 10,539,034 | B2 * | 1/2020 | Miller | F01D 11/003 |
| 11,047,481 | B2 | 6/2021 | Bidkar et al. | |
| 11,085,540 | B2 | 8/2021 | Fadgen et al. | |
| 11,193,590 | B2 | 12/2021 | Black | |
| 2015/0130137 | A1 * | 5/2015 | Sha | F16J 15/3288<br>277/306 |
| 2017/0362949 | A1 * | 12/2017 | Von Berg | F16J 15/24 |
| 2019/0072186 | A1 | 3/2019 | Bidkar et al. | |
| 2022/0136400 | A1 * | 5/2022 | Garrison | F16J 15/24<br>277/399 |
| 2022/0154590 | A1 | 5/2022 | Berard | |
| 2022/0268166 | A1 * | 8/2022 | Chuong | F16J 15/441 |

* cited by examiner

SEAL ASSEMBLY FOR A TURBINE ENGINE

FIELD

The present disclosure relates generally to turbine engines, and more particularly to seal assemblies for turbine engines.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by one or more rotor shafts and generally include multiple rows or stages of rotor blades coupled to the rotor shaft. Each individual row of rotor blades is axially spaced from a successive row of rotor blades by a respective row of stator or stationary vanes. A radial gap is formed between an inner surface of the stator vanes and an outer surface of the rotor shaft. Gas turbine engines may further include various seals to reduce and/or block flow (e.g., working fluid flow) leakage between various components of the gas engine.

BRIEF DESCRIPTION OF THE DRAWINGS

A full and enabling disclosure, including the best mode thereof, directed to one of ordinary skill in the art, is set forth in the specification, which refers to the appended Figures, in which.

DETAILED DESCRIPTION

Figure 1:
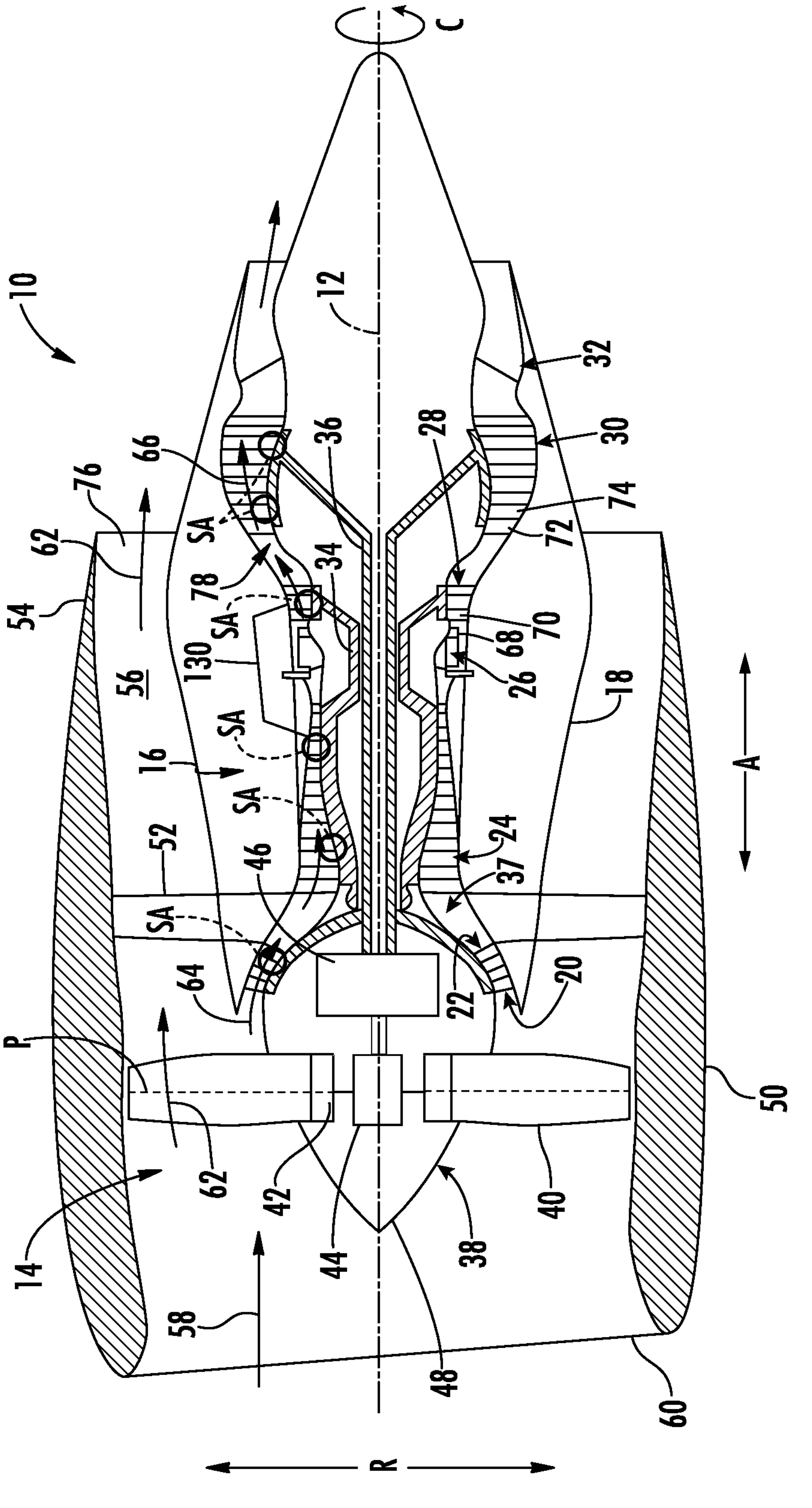
FIG. 1 is a cross-sectional view of a gas turbine engine in accordance with an aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" or "turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure is generally related to an aerodynamic seal assembly for a turbomachine of a gas turbine engine. A turbomachine generally includes a compressor section including a low-pressure compressor and a high-pressure compressor, a combustion section, and a turbine section including a high-pressure turbine and a low-pressure turbine arranged in serial-flow order. Each of the low-pressure compressor, the high-pressure compressor, the high-pressure turbine, and the low-pressure turbine include sequential rows of stationary or stator vanes axially spaced by sequential rows of rotor blades. The rotor blades are generally coupled to a rotor shaft and the stator vanes are mounted circumferentially in a ring configuration about an outer surface of the rotor shaft. Radial gaps are formed between the outer surface of the rotor shaft and an inner portion of each ring or row of stator vanes. Radial gaps can also be formed between the outer surface of the rotor shaft, and an inner portion of a non-rotating stationary part of the engine.

During operation, it is desirable to control (reduce or prevent) compressed air flow or combustion gas flow leakage through these radial gaps. As such, the seal assembly includes seal segments that are used to seal these radial gaps. In addition, during operation of the gas turbine engine, the stator is secured in place, whereas the rotor rotates with respect to the stator. Due to rotation-induced centrifugal loads, thermal loads (e.g., non-uniform temperature of the rotor and the stator) and pressure-induced forces, there is relative motion between the rotor and the stator. The relative motion between the rotor and the stator can be relative radial displacement or relative angular displacement about the tangential axis (e.g., coning about the tangential axis).

During such relative angular displacement (e.g., about the tangential axis) between the rotor and the stator, the seal assembly (and therefore the seal segments) will want to cone or pitch with the rotor but cannot do so because the seal segments are loaded against an aft wall of the stator.

Accordingly, disclosed herein is an aerodynamic seal assembly having seal segments disposed between the rotor and the stator. As used herein, an aerodynamic seal generally refers to a mechanical seal that uses a dynamic rotor and one or more grooves on the rotor or the stator that create an air film that the opposing sealing surface rides on. In particular, the rotor, the stator, and the seal assembly are arranged together to define a high pressure region and a low pressure region. A biasing member, such as a spring, is engaged with the seal segments. Furthermore, the seal assembly is segmented into a plurality of seal segments. In particular, in an embodiment, the plurality of seal segments includes a primary seal segment and a secondary seal segment connected together via a flexural joint. As such, the flexural joint allows for angular misalignment between the rotor and the stator. More specifically, the primary seal segment moves with the rotor and the secondary seal segment is loaded by the aft wall of the stator. In an embodiment, the seal segment(s) can be a two-member (or two-body) seal that includes the primary seal segment and the secondary seal segment.

Moreover, in an embodiment, to minimize high pressure fluid from leaking from the high pressure region to the low pressure region through the split two-body seal, the seal assembly may also include a static seal arranged between the primary seal segment and the secondary seal segment. In such embodiments, one or both of the primary seal segment or the secondary seal segment may include one or more grooves for receiving the static seal.

Referring now to the drawings, wherein identical numerals indicate the same elements throughout the figures, FIG. 1 is a schematic cross-sectional view of a gas turbine engine 10 in accordance with an embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The turbomachine 16 depicted generally includes a substantially tubular outer casing 18 that defines an annular inlet 20. The outer casing 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and a jet exhaust nozzle section 32. A high-pressure (HP) shaft 34 (which may additionally or alternatively be a spool) drivingly connects the HP turbine 28 to the HP compressor 24. A low-pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially spaced outlet guide vanes 52 in the embodiment depicted. Moreover, a downstream section 54 of the outer nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the gas turbine engine 10 depicted in FIG. 1 is by way of example only, and that in other embodiments, the gas turbine engine 10 may have any other suitable configuration. For example, although the gas turbine engine 10 depicted is configured as a ducted gas turbine engine (e.g., including the outer nacelle 50), in other embodiments, the gas turbine engine 10 may be an unducted gas turbine engine (such that the fan 38 is an unducted fan, and the outlet guide vanes 52 are cantilevered from, e.g., the outer casing 18).

Additionally, or alternatively, although the gas turbine engine 10 depicted is configured as a geared gas turbine engine (e.g., including the power gear box 46) and a variable pitch gas turbine engine (e.g., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated that in still other embodiments, aspects of the present disclosure may be incorporated into any other suitable gas turbine engine. For example, in other embodiments, aspects of the present disclosure may (as appropriate) be incorporated into, e.g., a turboprop gas turbine engine, a turboshaft gas turbine engine, or a turbojet gas turbine engine.

Figure 2:
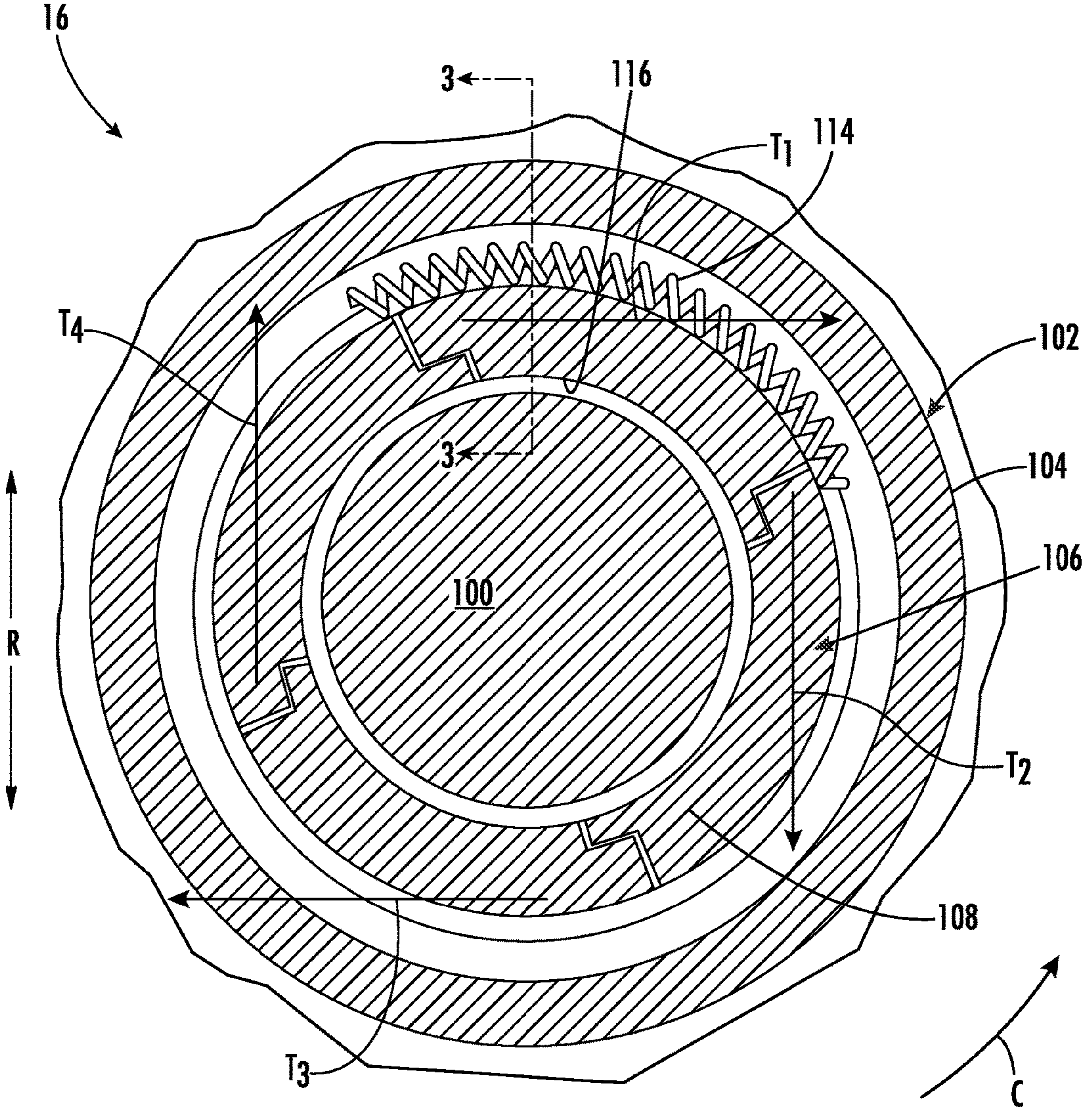
FIG. 2 is a cross sectional, schematic view of a portion of the turbomachine of FIG. 1.
Figure 3:
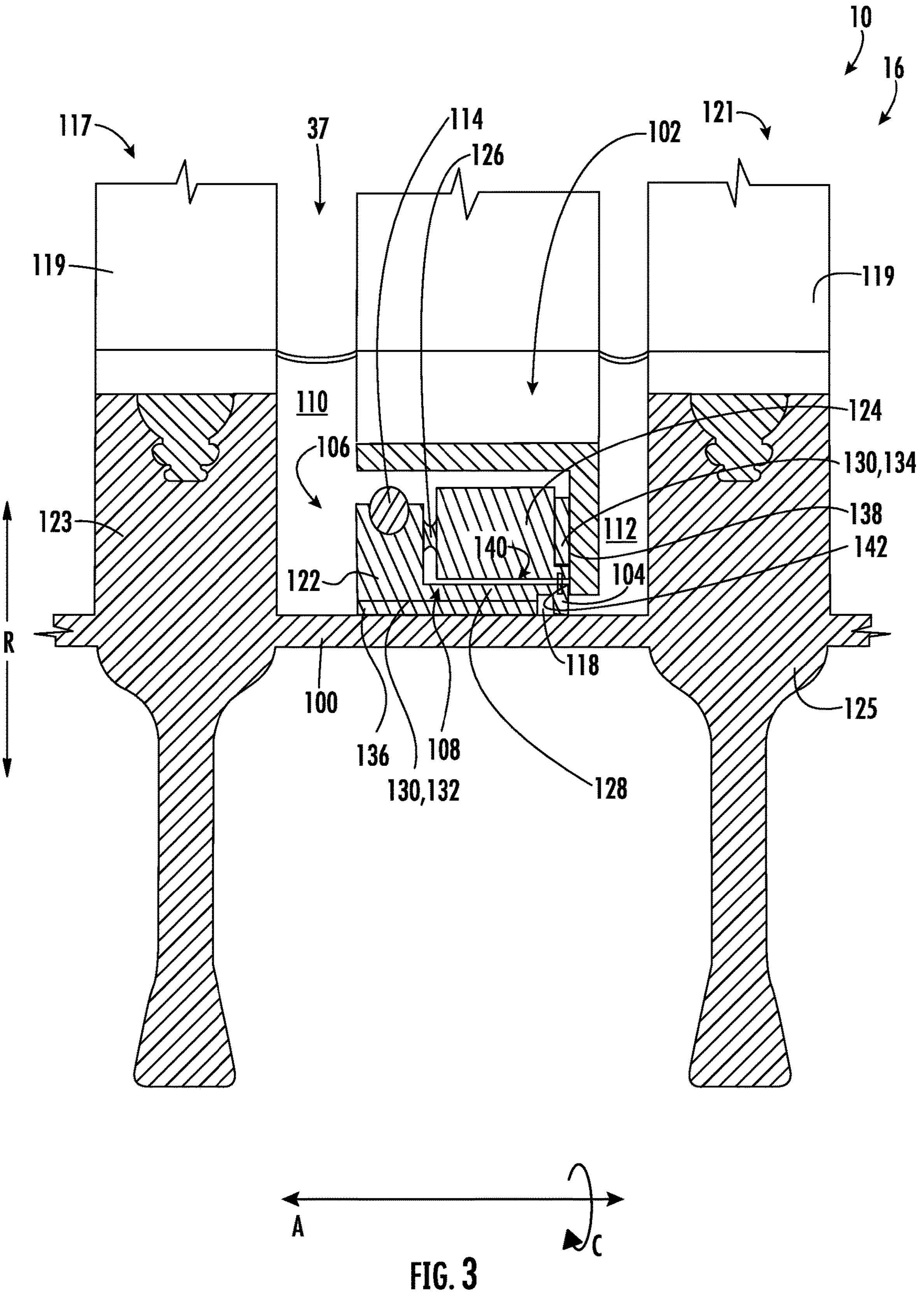
FIG. 3 is a close-up, schematic, cross-sectional view of a portion of the turbomachine of FIG. 2, taken along line 3-3.

Referring now to FIGS. 2 and 3, various views of a portion of the turbomachine 16 of FIG. 1 are provided. In particular, FIG. 2 illustrates a cross sectional, schematic view of a portion of the turbomachine 16 of FIG. 1. FIG. 3 illustrates a detailed, schematic cross-sectional view of a portion of the turbomachine 16 of FIG. 1. As will be appreciated and as generally shown in FIGS. 2 and 3, the turbomachine 16 generally includes a rotor 100, a stator 102, and a seal assembly 106 disposed between the rotor 100 and the stator 102. The rotor 100 may be any rotor of the turbomachine 16, such as the LP shaft 36, the HP shaft 34, etc. By way of example, referring briefly back to FIG. 1, circles SA have been added to FIG. 1 to provide example locations that the seal assembly 106 of the present disclosure may be incorporated into a turbomachine of the present disclosure.

As shown particularly in FIG. 3, the stator 102 further includes a stator vane 115 and the seal assembly 106 is, in the embodiment depicted, positioned at an inner end of a stator vane 115 along the radial direction R of the turbomachine 16. The turbomachine 16 further includes a first stage 117 of rotor blades 119 and a second stage 121 of rotor blades 119 spaced along the axial direction A of the gas turbine engine 10. The seal assembly 106 is positioned between the first stage 117 of rotor blades 119 and the second stage 121 of rotor blades 119 along the axial direction A.

In the embodiment depicted, the seal assembly 106 is positioned within a turbine section of the gas turbine engine 10, such as within the HP turbine 28 or the LP turbine 30. In such a manner, it will be appreciated that the rotor 100 may be a rotor coupled to the HP turbine 28, such as the HP shaft 34, or a rotor coupled to the LP turbine 30, such as the LP shaft 36. More specifically, still, in the illustrated embodiment, the rotor 100 is a connector extending between a disk 123 of the first stage 117 of rotor blades 119 and a disk 125 of the second stage 121 of rotor blades 119. It will be appreciated, however, that in other embodiments, the seal assembly 106 may be integrated into, e.g., a compressor section of the gas turbine engine 10.

Figure 4:
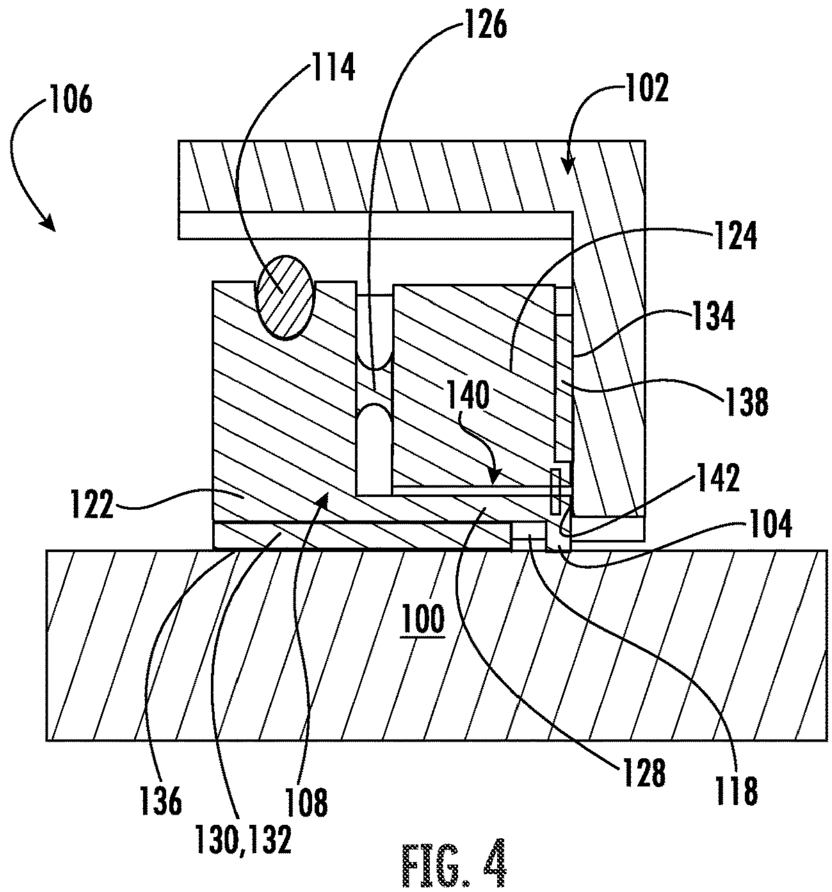
FIG. 4 is a close-up, schematic, cross-sectional view of a rotor, stator, carrier, and seal assembly of FIG. 3.

Referring still to FIG. 2, and as will be explained in more detail below, the seal assembly 106 includes a plurality of seal segments 108 that extends along the circumferential direction C between the rotor 100 and the stator 102. Further, in an embodiment, as shown in FIGS. 2 and 4, the seal segments 108 together define a sealing face 116. Further, as shown particularly in FIG. 4, the rotor 100, the stator 102, and the seal segments 108 are arranged together to define a high pressure region 110 and a low pressure region 112. In particular embodiments, as shown in FIG. 4, the high pressure region 110 is located forward of the low pressure region 112.

As will be appreciated, the seal segments 108 may be in fluid communication with a high pressure air source to provide a high pressure fluid (e.g., $P_{HIGH}$) flow to the seal segments 108. In at least certain aspects, the high pressure air source may be the working gas flowpath 37 provided through the gas turbine engine 10 and the seal assembly 106, e.g., at the high pressure region 110 of the seal assembly 106.

Further, as shown in FIGS. 2, 3, and 4, the seal assembly 106 includes at least one biasing member 114, such as a garter spring, engaged with the seal segments 108 for urging contact between the seal segments 108 and the rotor 100. In particular, as shown in FIGS. 2, 3 and 4, the biasing member(s) 114 is illustrated as simultaneously encompassing several of the seal segments 108 but is not connected to the stator 102. In such embodiments, the biasing member(s) 114 is configured as a garter spring that urges the seal segments 108 towards the rotor 100. Alternate embodiments are also possible where a compression spring or coil spring connects the seal segments 108 with the stator 102. In such embodiments, the compression spring(s) urges the seal segments 108 away from the rotor 100. Such an embodiment may be generally referred to herein as a retracted spring or springs. Furthermore, in such embodiments, in the absence of differential seal pressure, the retracted spring(s) pulls or "retracts" the seal segment(s) 108 away from the rotor 100. Moreover, upon pressurization, the pressure forces overcome the biasing force of the biasing member(s) 114 and urges the seal segment(s) 108 towards the rotor 100. In further embodiments, additional types of biasing members (e.g., tension springs, beam flexures, shape memory components, etc.) may be used to connect the seal segment(s) 108 to the stator 102 and/or the rotor 100.

Figure 6:
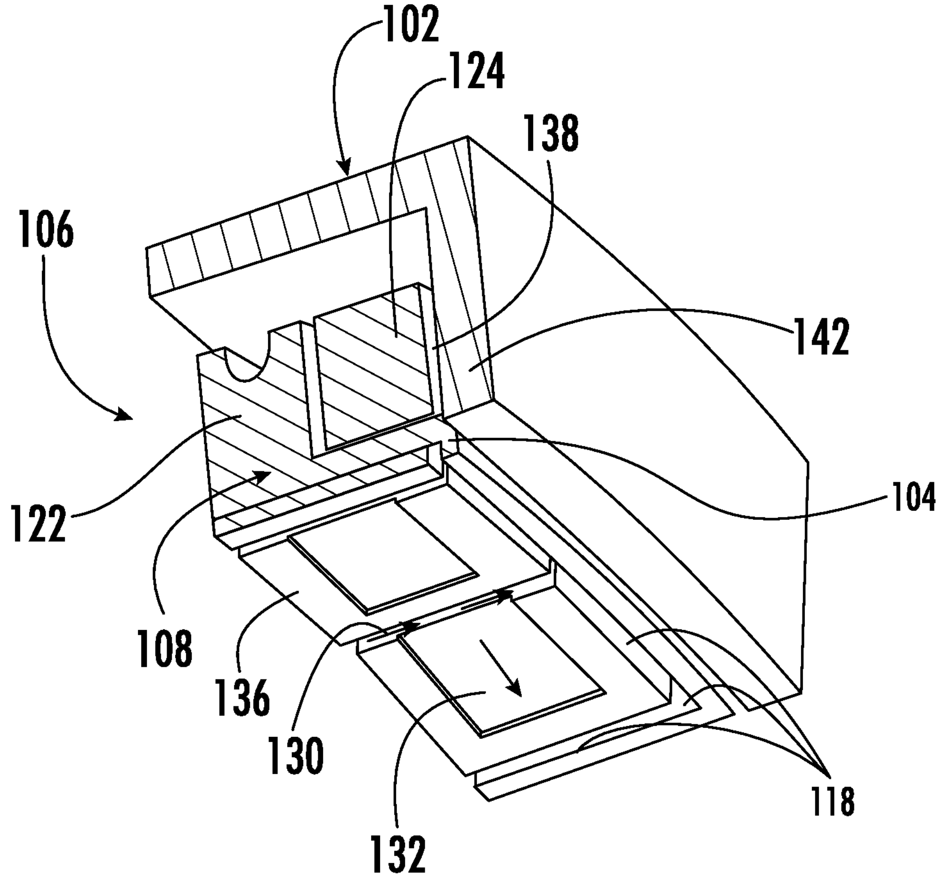
FIG. 6 is another close-up, perspective view of a portion of a seal assembly in accordance with an aspect of the present disclosure, particularly illustrating a rotor-side face of a seal segment of the seal assembly.

In addition, as shown in FIGS. 3 and 4, the seal assembly 106 may include a groove 118 in the sealing face 116 of the seal segments 108 along with a primary sealing dam 104. Further, as shown in FIG. 6, in an embodiment, the groove 118 and the primary sealing dam 104 turn around about 90-degrees on the edges of one of the seal segments 108, indicating that the groove 118 and primary sealing dam 104 are not just circumferential in directionality.

Figure 5:
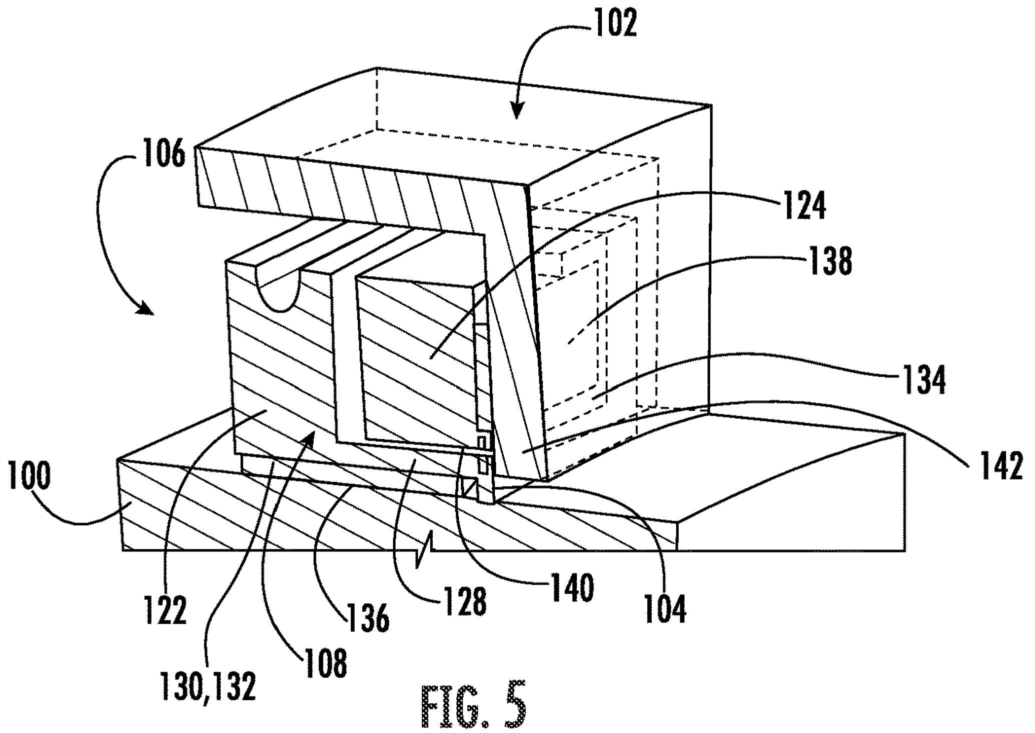
FIG. 5 is a close-up, perspective view of a portion of a seal assembly in accordance with an aspect of the present disclosure, particularly illustrating an aft-side face of a seal segment of the seal assembly.

Referring particularly to FIGS. 4 and 5, various cross-sectional views of different embodiments of the portion of the turbomachine 16 of FIG. 2 along line 3-3 are illustrated. In particular, as shown in FIGS. 4 and 5, the seal assembly 106 is segmented into a plurality of seal segments 108. More specifically, as shown, the plurality of seal segments 108 include a primary seal segment 122 and a secondary seal segment 124 connected together via a flexural joint 126 (FIG. 4). For example, in an embodiment, the flexural joint 126 may be a flexural pivot joint, a hinge joint, a flexural beam, a pin joint, or similar. Further, as shown, the secondary seal segment 124 is aft of the primary seal segment 122. Accordingly, the flexural joint 126 allows for relative motion between the primary seal segment 122 and the secondary seal segment 124 such that the primary seal segment 122 can track the rotor 100, and the secondary seal segment 124 can stay aligned with the stator 102. Overall, this configuration allows the flexural joint 126 allows the seal segments 108 to absorb the angular misalignment between the rotor 100 and the stator 102. As used herein, a flexural joint can ensure bending motion (e.g., flexing) that allows a rotational degree of freedom between neighboring elements connected by this flexure.

More specifically, due to rotation-induced centrifugal loads, thermal loads (e.g., non-uniform temperature of the rotor 100 and the stator 102) and pressure-induced forces, there is relative motion between the rotor 100 and the stator 102. The relative motion between the rotor 100 and the stator 102 can be relative radial displacement or relative angular displacement about a tangential axis (e.g., coning about one of the tangential axes $T_1$, $T_2$, $T_3$, $T_4$, of a respective seal segment 108 as shown in FIG. 3). During such relative angular displacement (about a respective tangential axis $T_1$, $T_2$, $T_3$, $T_4$, between the rotor 100 and the stator 102, the seal segments 108 allow the primary seal segment 122 to cone/pitch with the rotor 100, with the secondary seal segment 124 remaining loaded against an aft wall 142 of the stator 102.

In particular embodiments, as shown in FIGS. 4 and 5, the primary seal segment 122 defines a L-shaped cross sectional shape in the axial direction A. Furthermore, as shown, the L-shaped cross sectional shape generally defines a flange 128. Moreover, as shown, the secondary seal segment 124 generally defines a generally rectangular cross-sectional shape in the axial direction A. Thus, as shown in the illustrated embodiment, the secondary seal segment 124 is positioned on the flange 128 of the L-shaped cross sectional shape of the primary seal segment 122.

In further embodiments, as shown in FIGS. 4-6, the seal segments 108, the rotor 100, or both may include at least one channel 130 to connect the high-pressure region 110 to the groove 118. Alternately, the primary seal member 122 may include one or more holes formed therein along the radial direction R, e.g., to transport high-pressure air from the high-pressure region 110 to the groove 118. Further, the channel(s) 130 is configured to separate at least two aerodynamic features 132 (as shown in FIG. 6 as Rayleigh steps). The aerodynamic feature(s) 132 represents a portion of the primary seal segment 122 that is radially further from the rotor 100 than the radial face 136 of the primary seal segment 122. Nominally, the aerodynamic feature(s) 132 of the primary seal segment 122 runs at a slightly larger film thickness than the radial face 136 of the primary seal segment 122. This film thickness variation in the presence of rotational speed leads to the generation of aerodynamic lift and film between the primary seal segment 122 and the spinning rotor 100. Moreover, in an embodiment, the aerodynamic feature(s) 132 may be a spiral groove, a herringbone groove, or similar.

Referring particularly to FIGS. 4 and 5, the secondary seal segment 124 is in physical contact with the aft wall 142. In such embodiments, the contact is through a secondary seal dam 134 that loops around to form an internal pocket 138 between the secondary seal segment 124 and the aft wall 142. As such, air in the high-pressure region 110 can fill the internal pocket 138 and assists with axially force balance of the seal assembly 106, while the secondary seal dam 134 ensures the leakage of air from the internal pocket 138 to the downstream cavity is minimized.

Referring still to FIGS. 4 and 5, the seal assembly 106 may further include a static seal 140 arranged between the primary seal segment 122 and the secondary seal segment 124. For example, in an embodiment, the static seal 140 may be a spline seal, a C-seal, an E-seal, a rope seal, or a W-seal. In such embodiments, the static seal 140 reduces the leakage of air from the high pressure region 110 to the downstream cavity through a gap formed between the primary seal segment 122 and the secondary seal segment 124. In additional embodiments, the seal assembly 106 may also include one or more coatings to minimize radial friction or wear. In an embodiment, for example, the coating(s) can be applied either to the internal pocket 138 and/or the aft wall 142.

It should now be understood that the present disclosure is generally directed to an aerodynamic seal assembly for a turbomachine of a gas turbine engine. More particularly, the present disclosure is directed to a seal assembly that includes seal segments that are used to seal radial gaps between the rotor and the stator. Further, the seal assembly includes biasing member engaged with the seal segments. The seal segments include a primary seal segment and a secondary seal segment connected together via a flexural joint. As such, the flexural joint allows for angular misalignment between the rotor and the stator. More specifically, the primary seal segment moves with the rotor and the secondary seal segment is loaded by the aft wall of the stator. In an embodiment, the seal segment(s) can be a two-member seal that includes the primary seal segment and the secondary seal segment. Further, to minimize high pressure fluid from leaking from the high pressure region to the low pressure region through the split two-body seal, the seal assembly may also include a static seal arranged between the primary seal segment and the secondary seal segment. In such embodiments, one or both of the primary seal segment or the secondary seal segment may include one or more grooves for receiving the static seal.

Further aspects are provided by the subject matter of the following clauses.

A turbine engine, comprising: a rotor; a stator comprising an aft wall; a seal assembly comprising a plurality of seal segments disposed between the rotor and the stator, wherein the rotor, the stator, and the seal assembly are arranged together to define a high pressure region and a low pressure region; and at least one biasing member engaged with one or more of the plurality of seal segments, wherein the plurality of seal segments comprise a primary seal segment and a secondary seal segment connected together via a flexible joint, and wherein the flexible joint allows for angular misalignment between the primary seal segment and the secondary seal segment, thereby allowing the primary seal segment to move with the rotor while the secondary seal segment maintains contact with the aft wall of the stator.

The turbine engine of any preceding clause, wherein the secondary seal segment is aft of the primary seal segment.

The turbine engine of any preceding clause, wherein the primary seal segment defines a L-shaped cross sectional shape in an axial direction of the turbine engine, the L-shaped cross sectional shape defining a flange.

The turbine engine of any preceding clause, wherein the secondary seal segment defines a generally rectangular cross-sectional shape in the axial direction of the turbine engine, the secondary seal segment positioned on the flange of the L-shaped cross sectional shape of the primary seal segment.

The turbine engine of any preceding clause, wherein at least one of the primary seal segment or the rotor further comprises at least one aerodynamic feature to allow for a formation of an air film between the plurality of seal segments and the rotor.

The turbine engine of any preceding clause, wherein the at least one aerodynamic feature comprises at least one of a Rayleigh pad, a spiral groove, or a herringbone groove.

The turbine engine of any preceding clause, further comprising an internal pocket on an aft side of at least one of the plurality of seal segments, the internal pocket surrounded on multiple sides by a secondary seal dam.

The turbine engine of any preceding clause, wherein the seal assembly further comprises a static seal arranged between the primary seal segment and the secondary seal segment.

The turbine engine of any preceding clause, wherein the static seal comprises at least one of a spline seal, a C-seal, an E-seal, a rope seal, or a W-seal.

The turbine engine of any preceding clause, wherein the flexible joint comprises at least one of a pivot joint, a hinge joint, a flexural beam, or a pin joint.

The turbine engine of any preceding clause, wherein the at least one biasing member connects the plurality of seal segments to the stator and retracts the seal assembly away from the rotor in an absence of pressure.

The turbine engine of any preceding clause, wherein the at least one biasing member connects the plurality of seal segments to the stator and urges the seal assembly towards the rotor.

The turbine engine of any preceding clause, wherein the seal assembly further comprises one or more coatings to minimize radial friction or wear.

A seal assembly for a turbine engine having a rotor and a stator, the seal assembly comprising: a plurality of seal segments, wherein, when arranged together, the rotor, the stator, and the seal assembly define a high pressure region and a low pressure region, the plurality of seal segments comprising a primary seal segment and a secondary seal segment connected together via a flexible joint; and at least one biasing member engaged with one or more of the plurality of seal segments, wherein the flexible joint allows for angular misalignment between the primary seal segment and the secondary seal segment, thereby allowing the primary seal segment to move with the rotor while the secondary seal segment maintains contact with the aft wall of the stator.

The seal assembly of any preceding clause, wherein the secondary seal segment is aft of the primary seal segment, and wherein the primary seal segment defines a L-shaped cross sectional shape in an axial direction of the turbine engine, the L-shaped cross sectional shape defining a flange, and wherein the secondary seal segment defines a generally rectangular cross-sectional shape in the axial direction of the turbine engine, the secondary seal segment positioned on the flange of the L-shaped cross sectional shape of the primary seal segment.

The seal assembly of any preceding clause, wherein at least one of the primary seal segment or the rotor further comprises at least one aerodynamic feature to allow for a formation of an air film between the plurality of seal segments and the rotor.

The seal assembly of any preceding clause, wherein the at least one aerodynamic feature comprises at least one of a Rayleigh pad, a spiral groove, or a herringbone groove.

The seal assembly of any preceding clause, further comprising an internal pocket on an aft side of at least one of the plurality of seal segments, the internal pocket surrounded on multiple sides by a secondary seal dam.

The seal assembly of any preceding clause, wherein the seal assembly further comprises a static seal arranged between the primary seal segment and the secondary seal segment, and wherein the static seal comprises at least one of a spline seal, a C-seal, an E-seal, a rope seal, or a W-seal.

The seal assembly of any preceding clause, wherein the flexible joint comprises at least one of a pivot joint, a hinge joint, a flexural beam, or a pin joint.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine engine, comprising:

a rotor;

a stator comprising an aft wall;

a seal assembly comprising a plurality of seal segments disposed between the rotor and the stator, wherein the rotor, the stator, and the seal assembly are arranged together to define a high pressure region and a low pressure region; and at least one biasing member engaged with one or more of the plurality of seal segments, wherein the plurality of seal segments comprise a primary seal segment and a secondary seal segment connected together via a flexible joint, and wherein the flexible joint comprises at least one of a pivot joint, a hinge joint, or a pin joint to allow for angular misalignment between the primary seal segment and the secondary seal segment, thereby allowing the primary seal segment to move with the rotor while the secondary seal segment maintains contact with the aft wall of the stator.

2. The turbine engine of claim 1, wherein the secondary seal segment is aft of the primary seal segment.

3. The turbine engine of claim 1, wherein the primary seal segment defines an L-shaped cross sectional shape in an axial direction of the turbine engine, the L-shaped cross sectional shape defining a flange.

4. The turbine engine of claim 3, wherein the secondary seal segment defines a generally rectangular cross-sectional shape in the axial direction of the turbine engine, the secondary seal segment positioned on the flange of the L-shaped cross sectional shape of the primary seal segment.

5. The turbine engine of claim 1, wherein at least one of the primary seal segment or the rotor further comprises at least one aerodynamic feature to allow for a formation of an air film between the plurality of seal segments and the rotor.

6. The turbine engine of claim 5, wherein the at least one aerodynamic feature comprises at least one of a Rayleigh pad, a spiral groove, or a herringbone groove.

7. The turbine engine of claim 1, further comprising an internal pocket on an aft side of at least one of the plurality of seal segments, the internal pocket surrounded on multiple sides by a secondary seal dam.

8. The turbine engine of claim 1, wherein the seal assembly further comprises a static seal arranged between the primary seal segment and the secondary seal segment.

9. The turbine engine of claim 8, wherein the static seal comprises at least one of a spline seal, a C-seal, an E-seal, a rope seal, or a W-seal.

10. The turbine engine of claim 1, wherein the at least one biasing member connects the plurality of seal segments to the stator and retracts the seal assembly away from the rotor in an absence of pressure.

11. The turbine engine of claim 1, wherein the at least one biasing member connects the plurality of seal segments to the stator and urges the seal assembly towards the rotor.

12. The turbine engine of claim 1, wherein the seal assembly further comprises one or more coatings to minimize radial friction or wear.

13. A seal assembly for a turbine engine having a rotor and a stator, the seal assembly comprising:

a plurality of seal segments, wherein, when arranged together, the rotor, the stator, and the seal assembly define a high pressure region and a low pressure region, the plurality of seal segments comprising a primary seal segment and a secondary seal segment connected together via a flexible joint; and at least one biasing member engaged with one or more of the plurality of seal segments, wherein the flexible joint comprises at least one of a pivot joint, a hinge joint, or a pin joint to allow wherein the flexible joint allows for angular misalignment between the primary seal segment and the secondary seal segment, thereby allowing the primary seal segment to move with the rotor while the secondary seal segment maintains contact with the aft wall of the stator.

14. The seal assembly of claim 13, wherein the secondary seal segment is aft of the primary seal segment, and wherein the primary seal segment defines a L-shaped cross sectional shape in an axial direction of the turbine engine, the L-shaped cross sectional shape defining a flange, and wherein the secondary seal segment defines a generally rectangular cross-sectional shape in the axial direction of the turbine engine, the secondary seal segment positioned on the flange of the L-shaped cross sectional shape of the primary seal segment.

15. The seal assembly of claim 13, wherein at least one of the primary seal segment or the rotor further comprises at least one aerodynamic feature to allow for a formation of an air film between the plurality of seal segments and the rotor.

16. The seal assembly of claim 15, wherein the at least one aerodynamic feature comprises at least one of a Rayleigh pad, a spiral groove, or a herringbone groove.

17. The seal assembly of claim 13, further comprising an internal pocket on an aft side of at least one of the plurality of seal segments, the internal pocket surrounded on multiple sides by a secondary seal dam.

18. The seal assembly of claim 13, wherein the seal assembly further comprises a static seal arranged between the primary seal segment and the secondary seal segment, and wherein the static seal comprises at least one of a spline seal, a C-seal, an E-seal, a rope seal, or a W-seal.

* * * * *